UNITED STATES PATENT OFFICE.

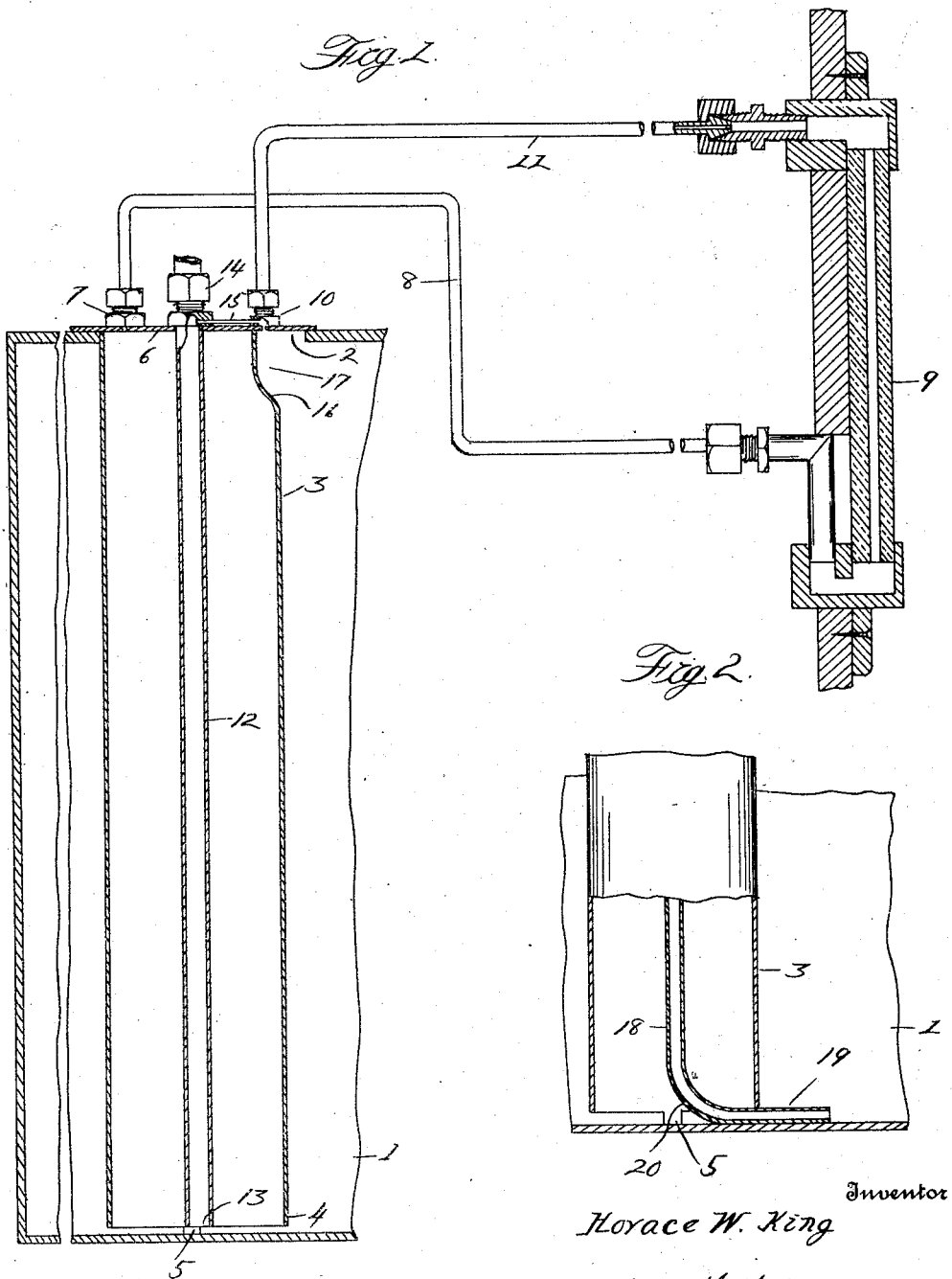

HORACE W. KING, OF ANN ARBOR, MICHIGAN.

DEPTH-INDICATING DEVICE.

1,364,504.  Specification of Letters Patent.  Patented Jan. 4, 1921.

Application filed May 23, 1919. Serial No. 299,323.

*To all whom it may concern:*

Be it known that I, HORACE W. KING, a citizen of the United States of America, residing at Ann Arbor, in the county of Washtenaw and State of Michigan, have invented certain new and useful Improvements in Depth-Indicating Devices, of which the following is a specification, reference being had therein to the accompanying drawings.

The invention relates to devices for indicating the depths of liquids and is particularly applicable to devices in which air under pressure is used to force a liquid from a tank but with proper modification it may be used to indicate the depths of liquids not under pressure. One object of the invention is to provide a construction having means for indicating the resistance offered to depressing a column of the liquid being measured. Another object of the invention is the provision of means for decreasing any fluctuations in the air pressure, due to the intermittent forcing of the air into the tank containing the liquid. Other objects of the invention reside in the novel arrangements and combinations of parts as more fully hereinafter set forth.

In the drawings:

Figure 1 is a longitudinal sectional view partly in elevation of a construction embodying my invention;

Fig. 2 is a longitudinal sectional view partly in elevation of a portion of a modified construction.

Generally speaking, my device comprises a tube adapted for the passage of air under pressure and extending into and communicating with the liquid being measured. This tube serves to receive a column of air which displaces a column of the liquid being measured having the same cross-sectional area. This column of liquid displaced has a certain weight, depending upon the depth thereof, and consequently offers a certain resistance to the column of air displacing the same, thereby imparting a certain pressure to the air. A pressure gage measures this pressure and is graduated to indicate the depth of the liquid.

As shown in detail, 1 is a gasolene tank upon an automobile and having an aperture 2 in its top. 3 is a tube extending through the aperture 2 and into the gasolene. The lower end 4 of this tube is open and terminates adjacent to the bottom of the tank 1, the projections or ears 5 being provided upon the tube and extending beyond its lower end to engage the bottom of the tank. The space between the lower end 4 of the tube 3 and the bottom of the gasolene tank should be as small as possible and at the same time large enough to allow the free passage of air beneath the tube. 6 is a cap for the tube 3. This cap also engages the top of the tank 1 and seals the opening 2 therein. Suitably secured to the cap 6 is the threaded nipple 7 communicating with the space inside the tube 3 and adapted for connection with the pipe connection 8 leading to one leg of the U-shaped pressure gage 9. The nipple 10 and the tube 11 connect the other leg of the gage to the top of the gasolene tank.

For supplying the air to the tube 3 to displace the gasolene therein, and to produce pressure in the tank when the gasolene is forced from the tank by air pressure, the inner tube 12 is provided. This tube extends substantially axially of the tube 3 and terminates near the bottom of the tank 1. The lower end 13 of this tube is open while the upper end is secured to the cap 6 and communicates with the threaded nipple 14 secured to the top. The nipple 14 is adapted to be connected to a suitable source of compressed air supply, such as a pump (not shown). A small tube 15, just above the top 6 of the tube 3 connects the nipples 14 and 10, which allows the air in the pressure line to communicate with the air in the top of the gasolene tank.

In operation, compressed air is forced through the nipple 14 and inner tube 12 and passes up through the liquid in the outer tube 3 to the upper end thereof, but a comparatively small quantity passes directly from the nipple 14 through the tube 15 to the top of the gasolene tank. This compressed air in the outer tube 3 displaces the liquid therefrom and the air then escapes up through the liquid in the tank outside the outer tube 3. The pipe connection 8 communicating with the upper end of the outer tube 3 and the gage 9, transmits the air pressure in the outer tube to one leg of the gage and the pipe connection 11 communicating with the top of the gasolene tank 1 and the other leg of the gage 9 transmits the air pressure in the gasolene tank above the gasolene to the other leg of the gage. The gage 9 then registers the difference between the air pressure in the tube 3 and the air pressure in the top of the gasolene tank and thus measures the depth of the gasolene in the tank. Owing to the comparatively large volume contained in the outer tube 3, the fluctuations caused by the intermittent supply of air into the outer tube will not be appreciable so that the gage can be easily read.

When air is pumped through the pipe (not shown) that is connected to the threaded nipple 14, most of the air passes out through the bottom of tube 12, but a small portion of the air passes through the small connecting tube 15 to the top of the gasolene tank. When the pump is not acting, if there should be a slight leak in the valve of the pump, without the bypass afforded by the tube 15 gasolene would be forced by the pressure in the gasolene tank through the pressure line and possibly into the pump. With the tube 15, if there is a leak in the pump, equilibrium between the pressure in the tube 12 and in the gasolene tank will be established and gasolene will rise in the tube to the same level as in the tank. The rise of gasolene in the tube 12 in no way affects the condition in the outer tube 3 and the depth of gasolene in the tank will be correctly registered by the gage whether the pump operates or not.

The gage 9 is preferably located on the dash in a position to be easily seen by the driver of the automobile. The device will operate equally satisfactorily regardless of the position or elevation of the gasolene tank relative to the gage.

For the purpose of having an attachment which is compact and can be readily inserted in the hole 2 of the tank 1, a portion 16 of the side wall of the outer tube 3, adjacent to the top 6 is bent inwardly to form the space 17 and the threaded nipple 10 is mounted on the top 6 and communicates with this space.

In the modified construction shown in Fig. 2, the inner tube 18 has the laterally bent portion 19 at its lower end which extends out below the lower end of and beyond the side of the outer tube 3. The tube 18 is open at its end to permit of the escape of the compressed air up through the liquid being measured. For the purpose of providing air in the outer tube 3, the inner tube is provided near its lower end and within the outer tube with the aperture 20, this aperture being at approximately the same elevation as the lower end of the outer tube.

Although I have shown in the drawings the device as applied to a gasolene tank where the gasolene is forced by pressure to the motor, it is to be understood that with slight modification the device can be adapted to the measurement of gasolene or oil in automobiles when not under pressure. It may also be used for indicating the depths of any liquids in any kind of tanks under any pressures or for indicating the surface elevation of natural bodies of water or the depth of floating objects. If the liquid whose depth is to be indicated is under atmospheric pressure parts 15, 10, 11, 16, and 17 may be dispensed with.

What I claim as my invention is:

1. The combination with a closed tank containing liquid, of a tube extending into said tank and terminating near the bottom thereof, said tube having an open lower end, a second tube extending longitudinally within said first-mentioned tube and terminating near the lower end thereof, said second tube adapted for the passage of air under pressure and communicating with the space inclosed by said first-mentioned tube, and a pressure indicator connected with said first-mentioned tube and said tank at points above the level of the liquid in said tank.

2. The combination with a closed tank containing liquid, of a device for indicating the depth of the liquid in said tank, comprising a tube extending into said tank and terminating near the bottom thereof, said tube having an open lower end, a second tube extending longitudinally within said first-mentioned tube and having its lower end laterally bent and extending outside said cylinder near the bottom of said tank, said second tube provided with an opening near its lower end and within said first-mentioned tube, said second tube adapted for connection with a supply of air under pressure, and a U-tube having one leg connected with said first-mentioned tube above the level of the liquid in said tank and having the other leg connected with said tank above the level of the liquid therein.

3. The combination with a tank having an opening in its top, of a tube extending through said opening and having a cap for closing said opening, a second tube extending longitudinally of said first-mentioned tube and having an opening into the space inclosed by said first-mentioned tube, said second tube being secured to said cap and adapted for the passage of air therethrough under pressure, a nipple upon said cap and communicating with said first-mentioned tube, a second nipple upon said cap and communicating with said tank at the side of said first-mentioned tube, and a U-gage having its legs connected with said nipples.

4. In a depth indicating device for liquids, the combination with a chamber closed at its upper end and communicating with a liquid only at the full depth to be measured, of means for conducting air into said chamber, said means communicating with said chamber only at substantially the same level as said chamber communicates with the liquid and a pressure indicator connected with said chamber.

5. The combination with a closed tank containing liquid, of a chamber closed at its upper end and communicating with the liquid only at the full depth to be measured, a tube communicating with said chamber only at substantially the same level as said chamber communicates with the liquid, said tube adapted for the passage of air, and means for indicating the difference in air pressures in said chamber and in said tank above the level of the liquid contained therein.

6. The combination with a closed tank containing liquid, of a chamber having a closed upper end and an open lower end at the full depth of the liquid to be measured, a tube extending within said chamber and opening thereinto only near the lower end thereof, said tube adapted for the passage of air and communicating with the space inclosed by said chamber, and means for indicating the difference in air pressure in said tank above the level of the liquid contained therein and in said chamber.

7. The combination with a closed tank containing liquid, of a chamber having a closed upper end and communicating with the liquid only at the full depth to be measured, of means for conducting air into said chamber only at substantially the level of the point of communication of said chamber with the liquid, a pressure indicator connected with said chamber, and means for equalizing the pressures of the air in said tank and air conducting means when the air no longer passes through said air conducting means.

8. The combination with a closed tank containing liquid, of a chamber closed at its upper end and communicating with the liquid only at the full depth to be measured, a tube communicating with said chamber only at substantially the same level as said chamber communicates with the liquid, said tube adapted for the passage of air, means for indicating the difference in air pressures in said chamber and in said tank above the liquid, and means above the level of the liquid in said tank for permitting of restricted passage of air from said tube to the space in said tank outside of said tube.

9. The combination with a closed tank containing liquid, of a chamber closed at its upper end and communicating with the liquid only at the full depth to be measured, of a means for conducting air into said chamber, said means communicating with said chamber only at substantially the same level as said chamber communicates with the liquid, and means for indicating the difference in air pressures in said chamber and in said tank above the level of the liquid contained therein.

In testimony whereof I affix my signature.

HORACE W. KING.